(12) United States Patent
Ben-Natan et al.

(10) Patent No.: US 9,699,145 B2
(45) Date of Patent: Jul. 4, 2017

(54) MASKING DATA WITHIN JSON-TYPE DOCUMENTS

(71) Applicant: International Business Machines Corporation, Armonk, NY (US)

(72) Inventors: Ron Ben-Natan, Lexington, MA (US); Tamar Domany, Kiryat Tivon (IL); Ariel Farkash, Shimshit (IL); Igor Gorkhman, Haifa (IL); Abigail Goldsteen, Haifa (IL); Boris Rozenberg, Ramat Gan (IL)

(73) Assignee: Internationl Business Machines Corporation, Armonk, NY (US)

( * ) Notice: Subject to any disclaimer, the term of this patent is extended or adjusted under 35 U.S.C. 154(b) by 148 days.

(21) Appl. No.: 14/526,547

(22) Filed: Oct. 29, 2014

(65) Prior Publication Data

US 2016/0127322 A1 May 5, 2016

(51) Int. Cl.
*H04L 29/06* (2006.01)
*G06F 21/62* (2013.01)

(52) U.S. Cl.
CPC .......... *H04L 63/04* (2013.01); *G06F 21/6254* (2013.01); *G06F 21/6263* (2013.01); *H04L 29/06* (2013.01)

(58) Field of Classification Search
USPC .......................................... 726/26
See application file for complete search history.

(56) References Cited

U.S. PATENT DOCUMENTS

| | | | |
|---|---|---|---|
| 2010/0185862 A1* | 7/2010 | Moore | H04L 9/08 713/171 |
| 2011/0313981 A1 | 12/2011 | Ben-Natan | |
| 2012/0278473 A1* | 11/2012 | Griffiths | G06F 17/30194 709/224 |
| 2013/0182849 A1 | 7/2013 | Wilkins et al. | |
| 2013/0212689 A1* | 8/2013 | Ben-Natan | H04L 63/20 726/26 |
| 2014/0258209 A1* | 9/2014 | Eshleman | G06F 17/30563 707/602 |

* cited by examiner

*Primary Examiner* — Jeffrey Pwu
*Assistant Examiner* — Samuel Ambaye

(57) ABSTRACT

A method comprising using at least one hardware processor for: receiving input from a user with respect to masking of a data element in one or more documents of a java script object notation (JSON) type, wherein the input comprises: an identifier of the data element, and one or more constraints for masking the data element based on the hierarchy of the one or more documents of the JSON-type; and generating a masking rule for the one or more documents of the JSON-type based on the input.

18 Claims, 6 Drawing Sheets

```
{
  "company":"aaa",
  "employees":[
    {
      "firstName": "Westlee",
      "lastName": "Barichak",
      "employeeNumber": 47901927,
      "salary": 18000,
      "employees": [
        {
          "firstName": "Lan",
          "lastName": "Dundas",
          "employeeNumber": 29472012,
          "salary": 15000
        }, {
          "firstName": "John",
          "lastName": "Doe",
          "employeeNumber": 29472023,
          "salary": 15000
        } ]
    }, {
      "firstName": "Mike",
      "lastName": "Chepsky",
      "employeeNumber": 01840192,
      "salary": 20000,
      "employees": [
       {
         "firstName": "Anna",
         "lastName": "Smith",
         "employeeNumber": 29472055,
         "salary": 13000
       }, {
         "firstName": "Peter",
         "lastName": "Jones",
         "employeeNumber": 29472073,
         "salary": 13300
       } ]
    } ]
}
```

MASKING DATA WITHIN JSON-TYPE DOCUMENTS

BACKGROUND

The present invention relates to the field of dynamic data masking.

The ever changing privacy requirements and regulations are forcing organizations to implement strict access policies to sensitive data. For example, the data in NoSQL ("Not Only Structured Query Language") databases may contain sensitive information. The adoption rate of NoSQL database solutions by enterprises is rising constantly. Several of the existing databases are using JavaScript Object Notation (JSON) and Binary JSON (BSON) as the interfaces to store and extract the data (e.g. MongoDB, CouchDB, etc.).

JSON is often defined as an open standard text format that uses human-readable text to transmit data objects consisting of name—value pairs. It is widely used to transmit data between a server and a web application, as an alternative to extendible markup language (XML). Although originally derived from the JavaScript scripting language, JSON is a language-independent data format, and code for parsing and generating JSON data is readily available in a large variety of programming languages.

BSON is a binary encoded serialization of JSON-like documents. It is often defined as a computer data interchange binary format commonly used as a data storage and network transfer format in the MongoDB database. It is a binary form for representing simple data structures and associative arrays (called "objects" or "documents" in MongoDB).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving input from a user with respect to masking of a data element in one or more documents of a java script object notation (JSON) type, wherein the input comprises: (i) an identifier of the data element, and (ii) one or more constraints for masking the data element based on the hierarchy of the one or more documents of the JSON-type; and generating a masking rule for the one or more documents of the JSON-type based on the input.

There is provided, in accordance with another embodiment, a method comprising using at least one hardware processor for: receiving a masking rule of a data element in one or more documents of a JSON-type, wherein the masking rule is based on the hierarchy of the one or more documents of the JSON-type; and enforcing the masking rule on a document of the one or more documents of the JSON-type.

There is provided, in accordance with yet another embodiment, a computer program product comprising a non-transitory computer-readable storage medium having program code embodied therewith, the program code executable by at least one hardware processor to: receive input from a user with respect to masking of a data element in one or more documents of a java script object notation (JSON) type, wherein the input comprises: (i) an identifier of the data element, and (ii) one or more constraints for masking the data element based on the hierarchy of the one or more documents of the JSON-type; and generate a masking rule for the one or more documents of the JSON-type based on the input.

In some embodiments, said at least one hardware processor is further used for enforcing the masking rule on a document of the one or more documents of the JSON-type.

In some embodiments, the enforcing of the masking rule on the document is performed online.

In some embodiments, the enforcing of the masking rule comprises: listening to traffic in a network, identifying the document as it passes through the network, and enforcing the masking rule on the object.

In some embodiments, the enforcing of the masking rule on the document is performed offline.

In some embodiments, the generating of the masking rule comprises generating a script.

In some embodiments, the language of the script is JavaScript.

In some embodiments, the language of the script is extended with one or more additional functions.

In some embodiments, the generating of the masking rule comprises generating a script, and the enforcing of the masking rule on the document comprises executing the script on the document.

In some embodiments, the receiving of the input from the user comprises providing the user with a form to be filled out and wherein the input is received by the form.

In some embodiments, the receiving of the input from the user comprises providing the user with a display of a document of the one or more documents of the JSON-type and wherein the input is received by a selection made by the user on the display.

In some embodiments, the one or more documents are selected from the group consisting of: documents, NoSQL queries response and messages.

In some embodiments, the JSON-type of the one or more documents is selected from the group consisting of: JSON documents and binary JSON (BSON) documents.

In some embodiments, said program code is further executable by the at least one hardware processor to enforce the masking rule on a document of the one or more documents of the JSON-type.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 1 shows a schematic illustration of an exemplary JSON document including a list of employees and related data;

FIG. 3B shows a schematic illustration of exemplary forms filled out by a user to generate masking rules for the JSON document of FIG. 1.

DETAILED DESCRIPTION

Figure 2A:
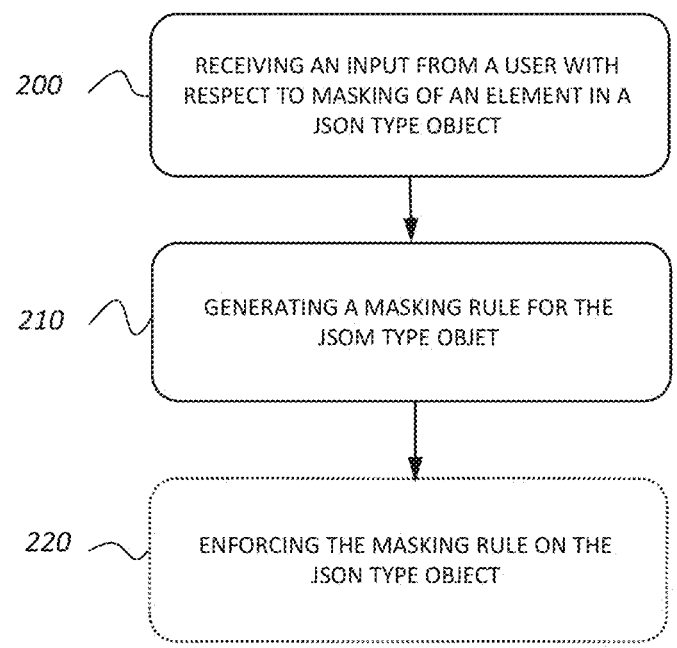
FIG. 2A shows a flowchart of a method, constructed and operative in accordance with an embodiment of the disclosed technique.

Methods and computer program products are disclosed herein, for concealing sensitive data in JSON-type documents by generating and enforcing one or more flexible masking rules on the JSON-type documents. The disclosed methods and computer program products may allow masking in the element level of the JSON-type documents and in a flexible and user-friendly way.

The sensitivity of a data element (or simply "element") may depend upon the location of the element in the JSON-type document and upon the values of other elements in the JSON-type document hierarchy. Accordingly, the elements to be masked may be defined depending on their location in the JSON-type document (such as in the full path of the JSON-type document), their ancestors in the JSON-type document hierarchy, their descendant, their siblings and/or the existence of other elements in the document. As JSON is basically hierarchy of name-value pairs, the masking rules may refer to the existence of a name and/or to the content of a value.

The terms "JSON-type document" or "a document of a JSON-type", as referred to herein, may relate to any document, including a NoSQL query response, a message, a file, or the like, which includes data in a JSON-type format. The terms "JSON-type document" or "a document of a JSON-type" may be used interchangeably herein below.

The term "JSON-type format", as referred to herein, may relate to a JSON format or a format similar to JSON, such as BSON. By "similar" it is meant including a representation of a collection of name-value pairs which are hierarchically-arranged. The JSON format is further described in the following two standards, which are incorporated herein by reference in their entirety: (1) Ecma International, "ECMA-404: The JSON Data Interchange Format" (October 2013); and (2) Internet Engineering Task Force (IETF), "RFC 7159: The JavaScript Object Notation (JSON) Data Interchange Format" (March 2014). The BSON format, in turn, is described in the following specification, which is incorporated herein by reference it its entirety: Unknown author, "BSON Specification Version 1.0", available at http://bson-spec.org/spec.html, last viewed Apr. 23, 2014.

The term "data element", as referred to herein with respect to a JSON-type document, may relate to any data element in the JSON-type document, which is in a JSON-type format. Such a data element may be, for example, a JSON object (or simply "object"), which may include one or more name-value pairs, a JSON name (or simply "name"), a JSON value (or simply "value"), a JSON array (or simply "array"), etc.

Reference is now made to FIG. 1, which shows a schematic illustration of an exemplary JSON document 100 including a list of employees and related data. In general, a JSON object may include a collection of name-value pairs and may be indicated as beginning with a left brace ({) and ending with a right brace (}). Thus, a JSON-type document (or simply "document") may include JSON objects (as shown in the example of FIG. 1). JSON-type document 100 (or simply document 100) includes data elements relating to the employees. As one may see, document 100 includes six types of name-value pairs. Each such type of name-value pair may be defined as a data element (or simply an element) of the document. The type of the pairs may be characterized according to the name of each such pair type and as follows: company name (i.e., "company"), employees (i.e., "employees"), first name (i.e., "firstName"), last name (i.e., "lastName"), employee number (i.e., "employeeNumber") and salary (i.e., "salary"). Each name is followed by a value, e.g.: "firstName": "Westlee" or "salary": 18000. A value may be a string in double quotes, a number, true or false or null, an object or an array. An array may be an ordered collection of values. For example, the value of the name "employees" is an array of objects (i.e., collection of name-value pairs relating to the managing employees or to the inferior employees).

Document 100 has an employee hierarchy and the name-value pairs are arranged in the document accordingly. Thus, the company aaa has two managing employees: Westlee and Mike (i.e., their first names). Each managing employee is responsible to two subordinate employees. Westlee is responsible to Ian and John (i.e., their first names) and Mike is responsible to Anna and Peter (i.e., their first names).

Figure 2B:
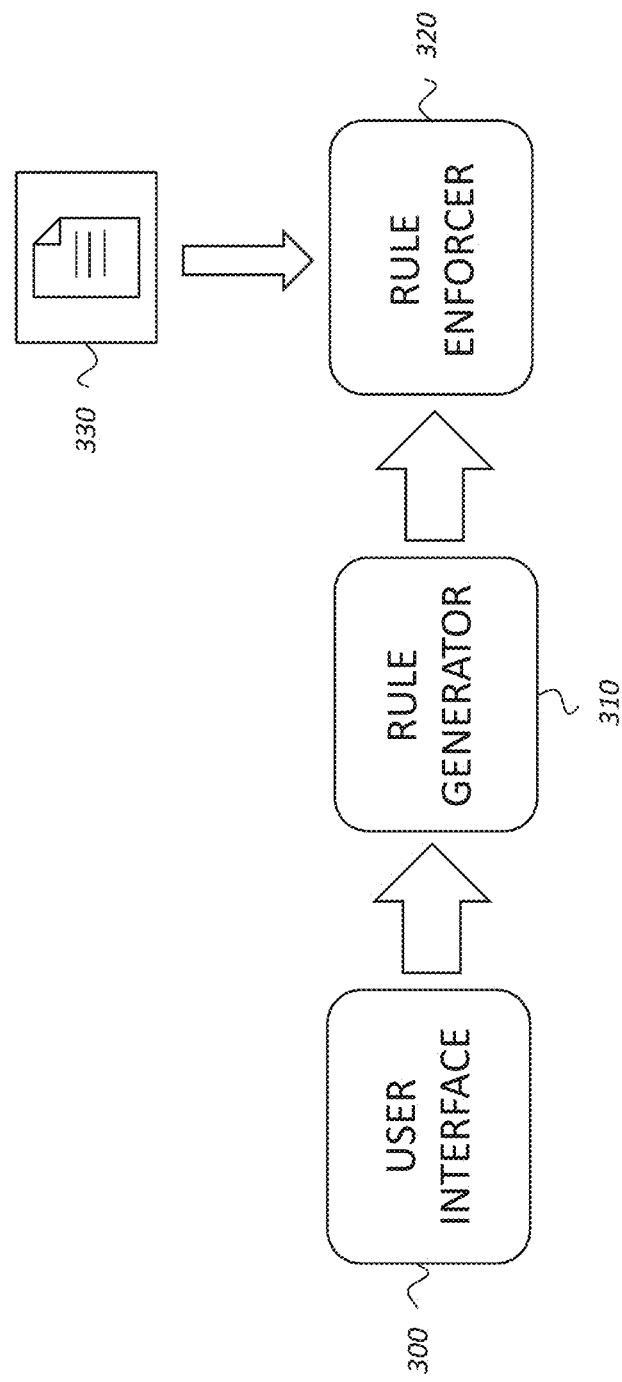
FIG. 2B shows a flowchart of an exemplary implementation of the method of FIG. 2A.

Reference is now made to FIGS. 2A and 2B. FIG. 2A shows a flowchart of a method, constructed and operative in accordance with an embodiment of the disclosed technique. FIG. 2B shows a flowchart of an exemplary implementation of the method of FIG. 2A. In a step 200, input from a user with respect to masking of a data element in one or more documents of a JSON-type may be received. The input may include an identifier of the data element and one or more constraints for masking the data element. The constraints may be based on the hierarchy of the one or more documents of the JSON-type.

The user input may be used for automatic masking rule generation as will be detailed herein below. Multiple masking rules may be generated for a single document of a JSON-type. A single masking rule may be generated for a plurality of documents of a JSON-type. Each rule may be aimed to masking of a certain data element. Multiple rules may be generated for masking a certain data element. The input may include an identifier of the data element which the user desires to mask and constraints for masking of the element. The constraints may be based on the hierarchy of the data in the JSON-type format (will be also referred as the hierarchy of the document). In some embodiments, the user input may be received by a user interface 300. User interface 300 may be, for example, a graphical user interface (GUI) or text-based interface or a combination thereof, as known in the art.

Figure 3A:
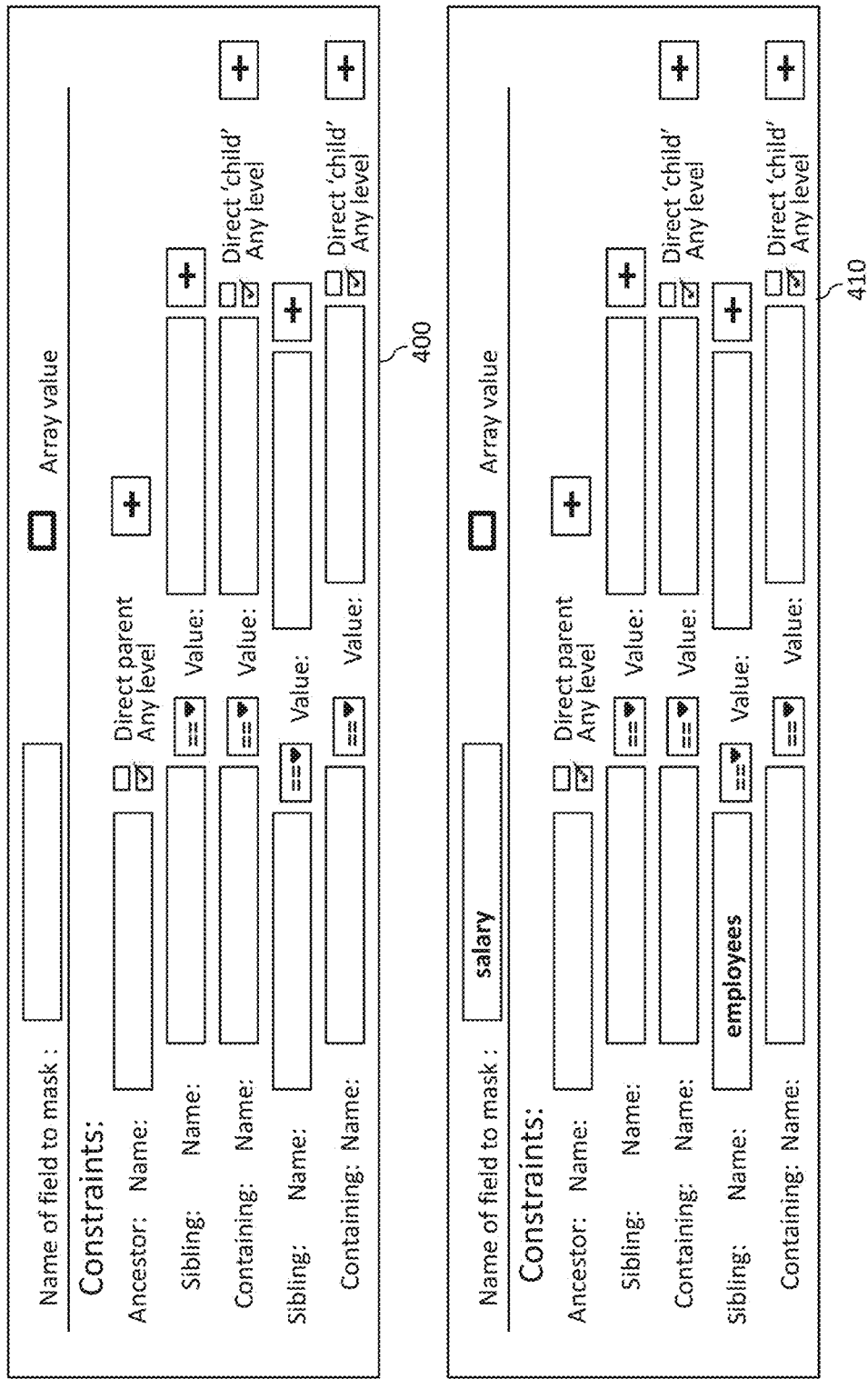
FIG. 3A shows a schematic illustration of an empty exemplary form for receiving input from a user and illustrations of the form when filled out by a user in order to generate masking rules for the JSON document of FIG. 1.

Optionally, the user interface may include a form. Thus, the user input may be received by the form. In such embodiments, the step of receiving the user input may include a step of providing the user with a form to be filled out. Reference is now made to FIG. 3A, which shows a schematic illustration of an empty exemplary form 400 for receiving input from a user and illustrations of form 410, which is form 400 when filled out by a user in order to generate masking rules for the JSON document of FIG. 1.

Form 400 is an empty exemplary form for receiving input from a user in order to mask an element in a document of a JSON type. In form 400, the user may define the data element he desires to mask by entering text into a text box indicated as: "Name of field to mask". Form 400 further includes a checkbox indicated as "Array value". If the value of the field to mask (i.e., the "name" of the name-value pair) is an array of values, then the array value checkbox should be checked. In such a case, new fields may be revealed in form 400 in order to allow the user to define masking of certain array elements (not shown).

Form 400 may include a section for defining constraints with respect to the entered name of the field to mask. The constraints may be based on the hierarchy of the document, i.e., of the name-value pairs of the document. The hierarchy may be defined as including three levels: ancestor (i.e., an ancestor of a data element may be a data element which is higher in the document hierarchy, e.g., it may be a direct parent of the data element), sibling (i.e., a sibling of a data element may be a data element which is parallel in the hierarchy of the document and which is a child of a direct parent of the data element), and descendent (i.e., a descendent of a data element may be a data element which is lower in the hierarchy of the document, e.g., a direct child of the data element). The latter is captured in form 400 by the 'containing' sub-constraint. Thus, form 400 may include options to define masking with respect to each such level of the hierarchy. In each hierarchy level, a user may enter a name and a value of such name (e.g., in text boxes). An equality relation may be selected as the default relation between the name and value, as shown in form 400. One may select to change the default relation between the name and the value, to another relation, by, for example, a list box listing available relations. The relation may be, for example, equal (indicated as "="), different (which may be indicated as "< >"), greater than (which may be indicated as ">") or less than (may be indicated as "<"). Form 400 may further include the option to further define each level of hierarchy. Thus, form 400 may include check boxes for reducing the hierarchy level of ancestors to a direct parent or of descendents to a direct child. The other option for these levels may be to check the "any level" box. In addition, a "+" button may be added in order to add another line to each hierarchy level for additional constraints (e.g., when constraints referring to first name and last name are required).

Form 410 shows form 400 when it is filled out by a user in order to mask salary (i.e., the data element) of managing employees only (i.e., the hierarchy constraints). For example, a user (e.g., a database administrator) would like to mask salaries of all of the managing employees. The user can make use of the fact that managing employees have a list of employees as a sibling in the hierarchy of document 100, while regular employees do not. The user may then fill form 400 such that a constraint is defined, according to which each salary of an employee having "employees" as a sibling is to be masked, as shown in form 410. By targeting only employees that contain such a reference to their employees, the user may define a rule to mask the salaries of the managing employees. Thus, the user may define a contextual rule without knowing the schema or at least the entire schema of document 100 and the rule, based on the rule language, may be automatically generated for the user.

Figure 3B:
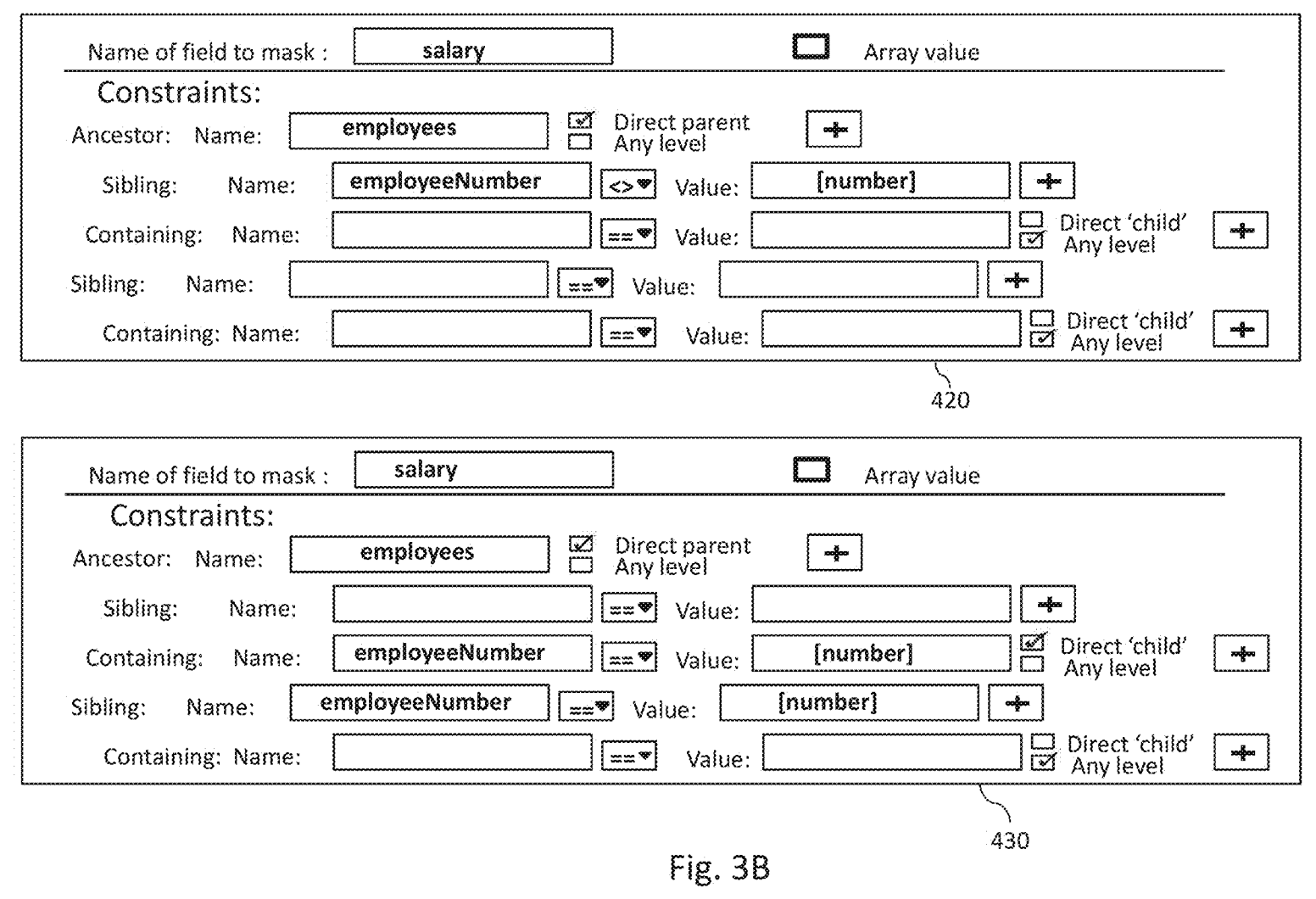

Reference is now made to FIG. 3B, which FIG. 3B shows a schematic illustration of exemplary forms 420 and 430 filled out by a user to generate masking rules for the JSON document of FIG. 1. Form 420, defines a rule that will prevent a managing employee to review the salaries of inferior employees other than his subordinate employees. Therefore, the rule is required to mask all salaries of inferior employees that their managing employee value of "employeeNumber" is different than a certain value. In terms of JSON context, this means that only if the salaries belong to inferior employees that are listed in the group of employees subordinate to that managing employee, will the managing employee be able to see them. Since we are defining a masking rule, the condition will be inequality, i.e. salaries of a manager by a different id will be masked.

Another example is shown in form 430. Here the definition of the rule relies on the fact that all subordinate employees are grouped according and under their managing employees (i.e., according to the document hierarchy). In this example, a user may define a rule which may mask the salary of peers, i.e. employees that have the same managing employee. The first constraint specifies the managing employee of a subordinate employee (will be referred herein as "the employee"), i.e., the subordinate employees list is required to include the employeeNumber of the employee. The second constraint specifies that the employeeNumber is not that of the employee itself. In essence, the logic of the rule may be phrased in hierarchy terms as: the son of my father, who is not myself, thus must be my brother.

Forms 400, 410, 420 and 430 are exemplary forms. The forms may be implemented in various designs and may use various controls, such as, text box, list box, checkbox etc., as known in the art.

Figure 4:
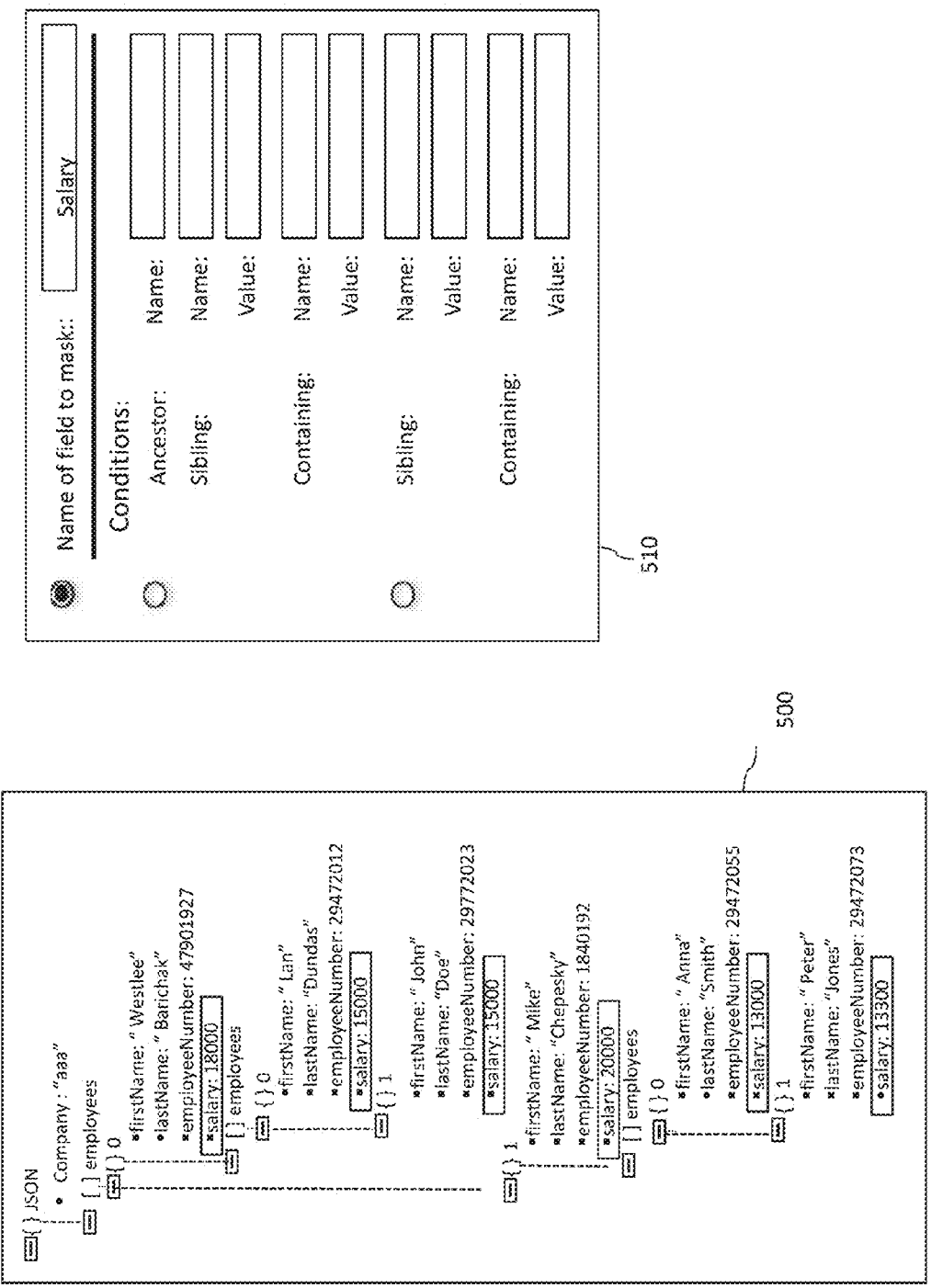
FIG. 4 shows schematic illustrations of an exemplary display of the JSON document of FIG. 1 and an exemplary interface for receiving a selection made by a user on the display in accordance with a further embodiment.

Optionally, the user interface may include a display of the document. Thus, the user input may be received by a selection made by the user on the display. In such embodiments, the step of receiving the user input may include a step of providing the user with a display of the document to be masked. Reference is now made to FIG. 4, which shows schematic illustrations of an exemplary display 500 of document 100 of FIG. 1 and an exemplary interface 510 for receiving a selection made by a user on display 500 in accordance with a further embodiment. In this option the user may be enabled to select the fields to mask and the conditions (i.e., constraints) for masking by selecting data elements on display 500. The user may select elements of document 100 in display 500 (e.g., by mouse clicking on desired elements). The selected elements may be indicated, for example, by frames, (i.e., be framed). The user may indicate what is defined by checking the check buttons in interface 510. For example, in user interface 510 the "Name of field to mask" button is checked. Thus the framed data element: "salary" may be automatically indicated in the text box of "Name of field to mask", s shown in the Figure. User interface 510 may accordingly include check buttons for constraints (i.e., conditions), wherein levels of hierarchy may be indicated by check buttons. Display 500 and user interface 510 are exemplary only and may be implemented in various designs, as known in the art.

In a step 210, a masking rule for the one or more documents of the JSON-type may be generated. The masking rule may be generated based on the input. The generation of the masking rule may include generating a script, such as JavaScript. Alternatively other programming languages may be used for generating a masking rule according to the disclosed technique, such as compiled languages, which may require a compilation process. Thus, the rules may be implemented as scripts that, when executed on the JSON-type documents, perform the required changes. The ending of the masking rule definition may trigger an automatic process that generates the rule to be performed, for example, at runtime by the sniffer. The ending of the definition process may be marked by the user, e.g., by clicking a "Save" button. In some embodiments, the rule generation may be performed by a rule generator 310. Rule generator 310 may be implemented as a computer program designated to receive input from user interface 300 and output a masking rule. The masking rule may be, for example, in the form of a programming script.

Optionally, if a programming language is used to generate the masking rule, the language may be extended with one or more additional functions. The additional functions may be used to ease the rule generation and enable the flexibility of expressing masking rules. In some embodiments, two new functions may be defined on a JSON-type document: search( ) and maskQ. The search( ) function may be applied on a JSON-type document. The search( ) function may receive a string as an input and may return (i.e., as an output) one or more data elements of the JSON-type document, which include the string. The mask( ) function may receive a data element as an input and return it masked. In some embodiments, one or more of the following functions may be added on the level of a data element of a JSON-type document: bool hasParent( ) bool hasAncestor( ) bool hasChild( ), bool hasDescendant( ) and bool hasSibling( ). The hasParent( ) function may receive a string as an input and may check if the name of a parent data element equals the received string. The function may return true or false accordingly. For example, document 100 of FIG. 1 includes a data element of name-value: "firstName": "Lan". If a function hasParent("Employees") is applied, the function will return true. The hasAncestor( ) function may receive a string and may check all the ancestors levels of hierarchy of a data element to find a match to the received string (as opposed to hasParent( ) which checks only a direct parent). With reference to the above example (i.e.: "firstName": "Lan"), hasAncestor( ) may return true for the received string "Employees" and also for "Company". The hasChild( ), hasDescendant( ) and hasSiblings( ) functions may receive a string and may check for a match on the direct children level, all levels of children or the siblings hierarchy level of the JSON-type document, correspondingly. These functions may return true or false according to the check result.

In an optional step 220, the masking rule may be enforced on a document of the one or more documents of the JSON-type. For example, in case the generating of the masking rule includes generating a script, the enforcing of the masking rule on the document may include executing the script on the document. In some embodiments, the enforcing of the masking rule on the document may be performed by a rule enforcer 320. Rule enforcer 320 may receive as input the masking rule generated by rule generator 310 and a JSON-type document, such as JSON document 330. Then, rule enforcer 320 may enforce the masking rule on JSON document 330. In case the rule is defined as a script, rule enforcer 320 may execute the script on JSON document 330.

In some embodiments, the masking rule may be enforced on the document in real time. In embodiments where the document is delivered over a network, the enforcing of the masking rule may include listening to traffic in the network (also known as "sniffing") and identifying a document to be masked as it passes through the network. Next, the masking rule may be enforced on the identified document, by intercepting the document in the traffic, masking a portion of the document, and releasing the masked document to continue its route in the traffic. For example, in the case of masking NoSQL query response like in mongoDB or CouchDB, the enforcing of masking rules may be performed by a sniffer that listens to the network messages delivered from the database to an application.

For example to sniff mongoDB query responses, one may use a driver of a kernel mode type (or simply a kernel mode driver) that may intercept socket communication for the database daemon. Thus, the kernel mode driver may be able to receive and even modify, if required, messages going from or to the database server. The intercepted communication may be then forwarded to a "collector" machine (i.e., outside the kernel) to analyze the message. Once the message is modified, i.e., some element are masked, it may be sent back to the kernel mode driver, which may, in turn, replace the original message with the modified one.

In some embodiments, the masking rule may be enforced on the document offline. For example, the enforcing of a masking rule may be a part of an offline process that is executed on JSON files stored in a file system, for example, before migrating to cloud storage or before presenting it on screen.

A method, constructed and operative in accordance with yet another embodiment of the disclosed technique, is described herein below. In a step 600, a masking rule of an element in one or more documents of a JSON-type may be received. The masking rule may be based on the hierarchy of the one or more documents of the JSON-type. The masking rule may be implemented as a script. The masking rule may be generated automatically, optionally, according to the method of FIG. 2A.

In a step 610, the masking rule may be enforced on a document of the one or more documents of the JSON-type. The masking rule may be enforced according to the method of FIG. 2A.

Although the description of the disclosed methods and computer program products may relate to generating and enforcing an element masking rule on a specific document, the element masking rule may be applied and enforced on additional documents, which include the element and hierarchy similar to the hierarchy of the specific document. Furthermore, and as far as the context allows, everywhere a single document is referred to, multiple documents may be referred to as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising using at least one hardware processor for: receiving input from a user with respect to masking of a data element in one or more documents of a java script object notation (JSON) type, said one or more documents each comprise a hierarchy of at least two levels identified by name-value pairs, wherein the input comprises:
(i) an identifier of the data element, and (ii) one or more constraints for masking the data element based on the hierarchy of the one or more documents of the JSON-type, said one or more constraints define the masking with respect to a level of the at least two levels: and generating a masking rule for the one or more documents of the JSON-type based on the input, wherein the masking role is generated automatically upon completion of the masking rule being defined by the input; wherein the generating of the masking rule comprises generating a script; and the enforcing of the masking rule on the document comprises executing the script on the document.

2. The method of claim 1, wherein said at least one hardware processor is further used for enforcing the masking rule on a document of the one or more documents of the JSON-type.

3. The method of claim 2, wherein the enforcing of the masking rule on the document is performed online.

4. The method of claim 3, wherein the enforcing of the masking rule comprises:
 listening to traffic in a network,
 identifying the document as it passes through the network, and
 enforcing the masking rule on the object.

5. The method of claim 2, wherein the enforcing of the masking rule on the document is performed offline.

6. The method of claim 1, wherein the generating of the masking rule comprises generating a script.

7. The method of claim 6, wherein the language of the script is JavaScript.

8. The method of claim 6, wherein the language of the script is extended with one or more additional functions.

9. The method of claim 1, wherein the receiving of the input from the user comprises providing the user with a form to be filled out and wherein the input is received by the form.

10. The method of claim 1, wherein the receiving of the input from the user comprises providing the user with a display of a document of the one or more documents of the JSON-type and wherein the input is received by a selection made by the user on the display.

11. The method of claim 1, wherein the one or more documents are selected from the group consisting of: NoSQL queries responses, messages and files.

12. The method of claim 1, wherein the JSON-type of the one or more documents is selected from the group consisting of: JSON documents and binary JSON (BSON) documents.

13. A method comprising using at least one hardware processor for: receiving a masking rule of a data element in one or more documents of a JSQN-type, said one or more documents each comprise a hierarchy of at least two levels identified by name-value pairs, wherein the masking rule is based on the hierarchy of the one or more documents of the JSON-type, wherein the masking rule is defined according to one or more constraints with respect to a level of the at least two levels; and enforcing the masking rule on a document of the one or more documents of the JSON-type; wherein the enforcing of the masking rule comprises, listening to traffic in a network; identifying the document as it passes through the network; and enforcing the masking rule on the document.

14. The method of claim 13, wherein the enforcing of the masking rule on the document is performed online.

15. The method of claim 13, wherein the enforcing of the masking rule on the document is performed offline.

16. A computer program product comprising a non-transitory computer-readable storage medium having program code embodied therewith, the program code executable by at least one hardware processor to: receive input from a user with respect to masking of a data element in one or more documents of a java script object notation (JSON) type, said one or more documents each comprise a hierarchy of at least two levels identified by name-value pairs, wherein the input comprises:
 (i) an identifier of the data element, and (ii) one or more constraints for masking the data element based on the hierarchy of the one or more documents of the JSON-type, said one or more constraints defines the masking with respect to a level of the at least two levels; and generate a masking rule for the one or more documents of the JSON-type based on the input, wherein the masking rule is generated automatically upon completion of the masking rule being defined by the input; wherein the generating of the masking rule comprises generating a script; and the enforcing of the masking rule on the document comprises executing the script on the document.

17. The computer program product of claim 16, wherein said program code is further executable by the at least one hardware processor to enforce the masking rule on a document of the one or more documents of the JSON-type.

18. The computer program product of claim 16, wherein the generating of the masking rule comprises generating a script.

* * * * *